US012565443B2

(12) United States Patent
Chung et al.

(10) Patent No.: US 12,565,443 B2
(45) Date of Patent: *Mar. 3, 2026

(54) ENVIRONMENTALLY-FRIENDLY GLASS COMPOSITION FOR LAUNDRY DETERGENTS AND WASHING SUPPLEMENTS, AND METHOD FOR MANUFACTURING GLASS POWDER THEREOF

(71) Applicant: LG ELECTRONICS INC., Seoul (KR)

(72) Inventors: Jaeyeop Chung, Seoul (KR); Namjin Kim, Seoul (KR); Young Seok Kim, Seoul (KR); Daesung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

This patent is subject to a terminal disclaimer.

(21) Appl. No.: 18/267,581

(22) PCT Filed: Nov. 9, 2021

(86) PCT No.: PCT/KR2021/016272
§ 371 (c)(1),
(2) Date: Jun. 15, 2023

(87) PCT Pub. No.: WO2022/131550
PCT Pub. Date: Jun. 23, 2022

(65) Prior Publication Data
US 2024/0076585 A1      Mar. 7, 2024

(30) Foreign Application Priority Data
Dec. 15, 2020    (KR) ........................ 10-2020-0175659

(51) Int. Cl.
C03C 3/064        (2006.01)
C03C 3/072        (2006.01)
(Continued)

(52) U.S. Cl.
CPC .............. C03C 3/064 (2013.01); C03C 3/072 (2013.01); C03C 12/00 (2013.01); C11D 3/1213 (2013.01);
(Continued)

(58) Field of Classification Search
None
See application file for complete search history.

(56) References Cited

U.S. PATENT DOCUMENTS

2005/0233888 A1    10/2005  Seneschal et al.
2007/0054793 A1*    3/2007  Sakoske ................. C03C 1/105
                                                    65/33.1
(Continued)

FOREIGN PATENT DOCUMENTS

JP      H 06-157026  A      6/1994
JP      2005-255517  A      9/2005
(Continued)

OTHER PUBLICATIONS

English text machine translation of Watanabe et al. (JP 2008/038100 A) accessed online from Espacenet; PDF pp. 1-10. (Year: 2008).*

*Primary Examiner* — Katie L. Hammer
(74) *Attorney, Agent, or Firm* — KED & ASSOCIATES

(57)        ABSTRACT

Disclosed are an environmentally-friendly glass composition for laundry detergents and washing supplements, and a method for manufacturing a glass powder thereof, wherein the glass composition is a borate glass containing large amounts of $K_2O$ and $Na_2O$ and a small amount of $SiO_2$, and the elution properties of ions are maximized, thus enabling the production of a high concentration of elution water. As (Continued)

a result, the present invention uses to advantage the low chemical durability of borate glass, which is a major disadvantage of borate glass, and thereby maximizes the elution properties of the glass to form a large amount of OH$^-$ ions and B(OH)$_4^-$ ions within a short period of time, and thus can exhibit excellent washing power during the washing of laundry.

20 Claims, 1 Drawing Sheet

(51) Int. Cl.

| | | |
|---|---|---|
| *C03C 12/00* | (2006.01) | |
| *C11D 3/12* | (2006.01) | |
| *C11D 7/10* | (2006.01) | |
| *C11D 7/20* | (2006.01) | |

(52) U.S. Cl.
CPC ................ *C11D 3/124* (2013.01); *C11D 7/10* (2013.01); *C11D 7/20* (2013.01); *C11D 2111/12* (2024.01)

(56) References Cited

U.S. PATENT DOCUMENTS

2010/0291237 A1\* 11/2010 Cook ...................... C03C 3/091
510/508
2015/0230476 A1 8/2015 Bookbinder et al.

FOREIGN PATENT DOCUMENTS

| | | | |
|---|---|---|---|
| JP | 2008-038100 A | 2/2008 |
| KR | 10-1982-0000228 B1 | 3/1982 |
| KR | 10-2016-0124193 A | 10/2016 |

\* cited by examiner

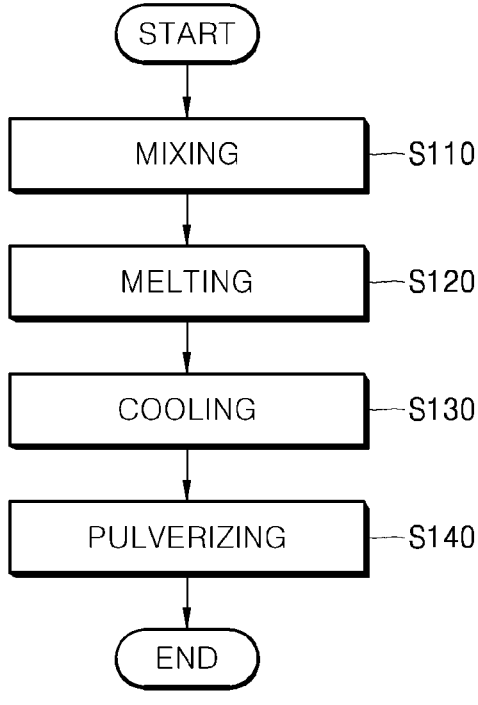

ENVIRONMENTALLY-FRIENDLY GLASS COMPOSITION FOR LAUNDRY DETERGENTS AND WASHING SUPPLEMENTS, AND METHOD FOR MANUFACTURING GLASS POWDER THEREOF

CROSS-REFERENCE TO RELATED PATENT APPLICATIONS

This application is a U.S. National Stage Application under 35 U.S.C. § 371 of PCT Application No. PCT/KR2021/016272, filed Nov. 9, 2021, which claims priority to Korean Patent Application No. 10-2020-0175659, filed Dec. 15, 2020, whose entire disclosures are hereby incorporated by reference.

FIELD

The present disclosure relates to a glass composition for eco-friendly laundry detergent and washing supplement, and a method for preparing glass powder thereof.

DESCRIPTION OF RELATED ART

In general, a process of removing stains from a fiber or laundry is referred to as laundry, and a process of removing stains from tableware is referred to as washing.

Such laundry and washing refer to removing contaminants by dispersing a surfactant in water and increasing alkalinity of water.

Because a method for performing the laundry and the washing using a synthetic detergent uses a large amount of water, the method has an excellent removal effect on aqueous contaminants, but has limitations in removing oil-based contaminants.

In addition, the existing synthetic detergent uses linear alkylbenzene, an anionic surfactant, a builder, and the like to remove dirty stains adhered to the laundry or the tableware and dry the laundry and the tableware.

However, when the laundry and the wash are performed using the existing synthetic detergent, environmental pollution is caused because of the surfactant not dissolving in water and causing eutrophication.

PRIOR ART LITERATURE

Patent Literature (Patent Document 1) Korean Patent Application Publication No. 10-2001-0089638 (published on Oct. 6, 2001)

DISCLOSURE

Technical Purposes

The present disclosure is to provide a glass composition for eco-friendly laundry detergent and washing supplement and a method for preparing glass powder thereof that present a new laundry solution using elution characteristics of glass.

In addition, the present disclosure is to provide a glass composition for eco-friendly laundry detergent and washing supplement that is borate glass containing large amounts of $K_2O$ and $Na_2O$ and a small amount of $SiO_2$ for maximizing elution of ions to prepare high-concentration elution water, and a method for preparing glass powder thereof.

In addition, the present disclosure is to provide a glass composition for eco-friendly laundry detergent and washing supplement and a method for preparing glass powder thereof that may prevent discoloration caused by dye contaminants by suppressing an increase in pH of elution water with use of borate glass, and contribute to a bleaching action by forming $B(OH)_4^-$ ions in the elution water.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

Technical Solutions

A glass composition for eco-friendly laundry detergent and washing supplement and a method for preparing glass powder thereof according to the present disclosure provide a new laundry solution using elution characteristics of glass.

To this end, the present disclosure provides a glass composition for eco-friendly laundry detergent and washing supplement that is borate glass containing large amounts of $K_2O$ and $Na_2O$ and a small amount of $SiO_2$ for maximizing elution of ions to prepare high-concentration elution water, and a method for preparing glass powder thereof.

In addition, the present disclosure may exhibit excellent laundry power during laundry by forming a large amount of $OH^-$ ions and $B(OH)_4^-$ ions in a short duration by maximizing elution of glass by taking advantage of low chemical durability, which is a representative disadvantage of borate glass.

In addition, when borate glass according to the present disclosure is eluted in water, alkali ions as well as $B(OH)_3$, $B(OH)_4$, and the like are formed together, so that pH does not rise above a certain level of 9 to 10. Accordingly, discoloration caused by a dye component does not occur.

To this end, a glass composition for eco-friendly laundry detergent and washing supplement includes 45 to 80 wt % of $B_2O_3$, 1 to 10 wt % of $SiO_2$, and 10 to 50 wt % of at least one of $Na_2O$ and $K_2O$.

In this regard, the $B_2O_3$ is preferably added in an amount in a range from 48 to 70 wt %, and the $SiO_2$ is preferably added in an amount in a range from 5 to 8 wt %.

In addition, at least one of $Na_2O$ and $K_2O$ is preferably added in an amount in a range from 20 to 45 wt %.

In addition, the $Na_2O$ and the $K_2O$ are preferably added in a range satisfying a following Formula 1.

$$0.5 \leq [Na_2O]/[K_2O] \leq 1.5 \qquad \text{Formula 1:}$$

Here, [ ] represents a content ratio of each component.

In this regard, the $B_2O_3$ exists as $BO_3$ and $BO_4$ in glass, and a $N_4$ value, a ratio of a $BO_4$ structure, is preferably contained in a range satisfying a following Formula 2.

$$0.3 \leq ([BO_4])/([BO_3]+[BO_4]) \leq 0.52 \qquad \text{Formula 2:}$$

Here, [ ] represents a weight ratio of each component.

Technical Effects

According to the present disclosure, the excellent washing power compared to that of the existing commercial detergents may be exhibited.

In addition, according to the present disclosure, because the surfactant is not added, not only the rinsing process may be shortened, but also the water consumption may be reduced during the laundry.

In addition, according to the present disclosure, when using the glass powder for the eco-friendly laundry detergent and washing supplement as the laundry detergent or the washing supplement, the washing power may be maximized when the glass powder is used together with the glass elution water, so that the energy saving effect may be achieved with the reduction of the laundry duration and the reduction of the water consumption.

In addition, according to the present disclosure, when the glass powder for the eco-friendly laundry detergent and washing supplement prepared is used as the laundry detergent or the washing supplement and put into the automatic detergent box of the washing machine, the glass may be homogeneously and constantly eluted, so that the recurring period may be extended and the high reliability may be maintained even in the repeated laundry processes.

In addition to the above effects, specific effects of the present disclosure will be described together while describing specific details for carrying out the present disclosure.

BRIEF DESCRIPTION OF DRAWINGS

FIG. 1 is a process flowchart showing a method for preparing glass powder for eco-friendly laundry detergent and washing supplement according to an embodiment of the present disclosure.

DETAILED DESCRIPTIONS

The above objects, features, and advantages will be described in detail later with reference to the accompanying drawings. Accordingly, a person having ordinary knowledge in the technical field to which the present disclosure belongs will be able to easily implement the technical idea of the present disclosure. In describing the present disclosure, when it is determined that a detailed description of a known technology related to the present disclosure may unnecessarily obscure the gist of the present disclosure, the detailed description will be omitted. Hereinafter, preferred embodiments according to the present disclosure will be described in detail with reference to the accompanying drawings. In the drawings, the same reference numerals are used to indicate the same or similar components.

As used herein, the singular constitutes "a" and "an" are intended to include the plural constitutes as well, unless the context clearly indicates otherwise. In this application, terms such as "composed of" or "include" should not be construed as necessarily including all of various components or steps described herein, but should be construed that some components or steps among those may not be included or additional components or steps may be further included.

Hereinafter, a glass composition for eco-friendly laundry detergent and washing supplement and a method for preparing glass powder thereof according to some embodiments of the present disclosure will be described.

A glass composition for eco-friendly laundry detergent and washing supplement according to an embodiment of the present disclosure provides a new laundry solution utilizing elution characteristics of glass.

To this end, the glass composition for the eco-friendly laundry detergent and washing supplement according to the embodiment of the present disclosure is borate glass containing large amounts of $K_2O$ and $Na_2O$ and a small amount of $SiO_2$. The borate glass maximizes elution of ions and enables production of high-concentration elution water. In this regard, the activated elution water exhibits excellent washing power in various soiled fabrics, and especially improves a laundry efficiency when used together with detergent.

In addition, the glass composition for the eco-friendly laundry detergent and washing supplement according to the embodiment of the present disclosure may prevent discoloration caused by dye contaminants by suppressing an increase in pH of the elution water with use of the borate glass, and may contribute to a bleaching action by forming $B(OH)_4$ ions in the elution water.

In general, chemical durability of glass means a resistance of the glass to an aqueous solution or water. According to the theory of Hench and Clark, elution phenomena are classified into following five types.

First, a thin hydrate layer is formed on a glass surface.

Second, a layer with a low alkali content is formed under the hydrate layer.

Third, multiple reaction layers are formed on the glass surface.

Fourth, significant erosion occurs even after dissolution.

Fifth, the dissolution occurs quickly and no further erosion occurs.

Therefore, in general silicate glass containing a large amount of $SiO_2$, as a content of alkali or alkaline earth ions that ion-exchange with $H_3O^+$ increases, chemical durability decreases and elution into water is facilitated.

In one example, $B_2O_3$ is as a representative glass-forming oxide along with $SiO_2$, and the borate glass containing a large amount of $B_2O_3$ is widely used for low-dispersion, high-refractive optical glass. In addition, $B_2O_3$ may absorb thermal neutrons more strongly than $SiO_2$, transmit an X-ray easily, and contain a large amount of rare earth oxide. Therefore, $B_2O_3$ is widely used in special glass fields such as glass for absorbing the thermal neutrons, glass for transmitting the X-ray, glass for coating an inner surface of a Na and Cs discharging lamp, and glass for bonding highly insulating glass to ceramic/metal.

However, the borate glass has a disadvantage in that chemical durability is lower than that of the silicate glass.

Accordingly, in the present disclosure, a large amount of $OH^-$ ions and $B(OH)_4$ ions are formed in a short duration by maximizing the elution of the glass by taking advantage of the low chemical durability, which is the representative disadvantage of the borate glass. This is for use in a laundry detergent or a washing supplement that may exhibit excellent laundry power during laundry.

In addition, in the present disclosure, one of main characteristics of the borate glass affecting the laundry is a pH buffer role. In a case of general alkali silicate glass, when a large amount of alkali ions are eluted in water, a large amount of $OH^-$ ions are formed and the pH is increased to a level equal to or higher than 10 to 12. In this case, discoloration caused by a dye component may occur, which may cause discoloration problems when used as the laundry detergent.

On the other hand, when the borate glass according to the present disclosure is eluted in water, the alkali ions as well as $B(OH)_3$, $B(OH)_4$, and the like are formed together, so that the pH does not rise above a certain level of 9 to 10. Accordingly, the discoloration caused by the dye component does not occur.

To this end, the glass composition for the eco-friendly laundry detergent and washing supplement according to the embodiment of the present disclosure contains 45 to 80 wt % of $B_2O_3$, 1 to 10 wt % of $SiO_2$, and 10 to 50 wt % of at least one of $Na_2O$ and $K_2O$.

In this regard, $B_2O_3$ is preferably added in an amount in a range from 48 to 70 wt %, and $SiO_2$ is preferably added in an amount in a range from 5 to 8 wt %.

In addition, it is more preferable that at least one of $Na_2O$ and $K_2O$ is added in an amount in a range from 20 to 45 wt %.

In addition, $Na_2O$ and $K_2O$ are preferably added in an amount range that satisfies following Formula 1.

$$0.5 \leq [Na_2O]/[K_2O] \leq 1.5 \qquad \text{Formula 1:}$$

Here, [ ] represents the content ratio of each component.

In this regard, $B_2O_3$ exists as $BO_3$ and $BO_4$ in the glass, and it is preferable that a $N_4$ value, which is a ratio of a $BO_4$ structure, is contained within a range that satisfies Formula 2 below.

$$0.3 \leq ([BO_4])/([BO_3]+[BO_4]) \leq 0.52 \qquad \text{Formula 2:}$$

Here, [ ] represents a weight ratio of each component.

Therefore, the present disclosure may provide the new laundry solution by developing the eco-friendly detergent that exhibits superior washing power compared to an existing commercial detergent.

According to the present disclosure, because no surfactant is added, not only a rinsing process may be shortened, but also a water consumption may be reduced during the laundry.

In addition, according to the present disclosure, when the laundry detergent or the washing supplement and the glass elution water are used together, an energy saving effect may be achieved by reducing a laundry duration with the maximization of the washing power.

In addition, when the glass composition for the eco-friendly laundry detergent and washing supplement according to the embodiment of the present disclosure is used as the laundry detergent or the washing supplement and put into an automatic detergent box, the glass may be homogeneously and constantly eluted, so that a recurring period may be extended and high reliability may be maintained even in repeated laundry processes.

Hereinafter, a role and a content of each component of the glass composition for the eco-friendly laundry detergent and washing supplement according to the embodiment of the present disclosure will be described in detail.

$B_2O_3$, as a glass former that is representatively used together with $SiO_2$, is a key component that enables sufficient vitrification and forms a core framework within a structure of the glass. $B_2O_3$ primarily exists in the form of $BO_3$ and $BO_4$, with tricoordinated and tetracoordinated structures, respectively, within the glass, and also plays a role in lowering a melting temperature of the glass.

Compared to $SiO_2$-based glass, the glass containing a large amount of $B_2O_3$ is vulnerable to water, maximizing the elution of the glass. In addition, $B_2O_3$ has the bleaching effect during the elution and serves as the pH buffer, and thus, does not cause the discoloration by the dye contaminants.

Therefore, $B_2O_3$ is preferably added in a content ratio in a range from 45 to 80 wt % of a total weight of the glass composition for the eco-friendly laundry detergent and washing supplement according to the present disclosure, and a range from 48 to 70 wt % may be presented as a more preferable range. When the amount of $B_2O_3$ added is smaller than 45 wt %, the bleaching effect may not be exhibited properly, which makes it difficult to secure the washing power. Conversely, when the amount of $B_2O_3$ added exceeds 80 wt %, a decrease in water resistance may occur because of a nature of the elements resulted from structural problems of B and P in a network-forming structure.

$SiO_2$, the most representative glass former oxide, increases the water resistance of the glass, and increases a washing power of the dye contaminants when added in a small amount. Therefore, $SiO_2$ is preferably added in a content ratio in a range from 1 to 10 wt % of the total weight of the glass composition for the eco-friendly laundry detergent and washing supplement according to the present disclosure, and a range from 5 to 8 wt % may be presented as a more preferred range. When a large amount of $SiO_2$ is added in excess of 10 wt %, the laundry power is greatly reduced as the elution is rapidly reduced caused by strengthening of a glass structure. Conversely, when $SiO_2$ is added in an amount smaller than 1 wt %, the structure of the glass is weakened and thus the water resistance is deteriorated.

$Na_2O$ and $K_2O$ are alkali oxides, which act as network modifiers performing non-bridging bond in the glass composition. The vitrification is impossible with such components alone, but the vitrification becomes possible when such components are mixed with the glass former such as $SiO_2$, $B_2O_3$, $P_2O_5$, $V_2O_5$, $Ga_2O_3$, and the like in a certain ratio.

The alkali ions are ion-exchanged with $H_3O^+$ to elute into water and form the $OH^-$ ions, so that the alkali ions are a major component in exerting the laundry and washing power. However, when the alkali components are contained in a large amount, a concentration of the $OH^-$ ions increases, and thus, the pH increases to a level equal to or higher than 10 to 11, which causes the discoloration by the dye component.

Therefore, because the elution characteristics of the glass vary greatly depending on the content ratios of the alkali oxide and $B_2O_3$, controlling the content ratios is a key of the present disclosure. In the present disclosure, a glass composition that has excellent initial elution characteristics and elutes well even when being continuously used is experimentally confirmed. As a result, it is confirmed that, when the alkali oxide is added in the glass in the content in a range from 10 to 50 wt %, characteristics are excellent.

Therefore, at least one of $Na_2O$ and $K_2O$ is preferably added in the content ratio in the range from 10 to 50 wt % of the total weight of the glass composition for the eco-friendly laundry detergent and washing supplement according to the present disclosure, and the range from 20 to 45 wt % may be presented as a more preferable range. When at least one of $Na_2O$ and $K_2O$ is added in an amount smaller than 10 wt %, it may be difficult to secure washing continuity. Conversely, when at least one of $Na_2O$ and $K_2O$ exceeds 50 wt %, the discoloration by the dye component may be caused resulted from an increase in the concentration of the $OH^-$ ions.

In addition, it is more preferable that $Na_2O$ and $K_2O$ are added in a range satisfying Formula 1 below.

$$0.5 \leq [Na_2O]/[K_2O] \leq 1.5 \qquad \text{Formula 1:}$$

Here, [ ] represents a content ratio of each component.

This is because when it is out of the range of Formula 1 above, an effect of lowering a melting point via a eutectic point of $Na_2O$—$K_2O$ may be deteriorated fall and the vitrification may not be performed.

In the glass composition for the eco-friendly laundry detergent and washing supplement according to the embodiment of the present disclosure, $B_2O_3$ exists as $BO_3$ and $BO_4$ in the glass, and the $N_4$ value, which is the ratio of the $BO_4$ structure, is preferably contained within a range that satisfies Formula 2 below.

$$0.3 \leq ([BO_4])/([BO_3]+[BO_4]) \leq 0.52 \qquad \text{Formula 2:}$$

Here, [ ] represents a weight ratio of each component.

In other words, in the glass composition for the eco-friendly laundry detergent and washing supplement according to the embodiment of the present disclosure, boron ions exist in the form of tricoordinate ($BO_3$), and the structure thereof changes from $BO_3 \rightarrow BO_4$ (tetracoordinate) as the content of alkali ions increases. When the content of alkali ions is equal to or higher than a certain level, a reverse phenomenon of $BO_4 \rightarrow BO_3$ occurs, and such structural change greatly affects physical properties of the glass. In this regard, the ratio of the $BO_4$ structure is referred to as the $N_4$ value. The $N_4$ value may be calculated using a YDB (Yun, Dell, and Bray) model.

In the YDB model, a R value ($R=[R_2O]/[B_2O_3]$) is a molar ratio between the alkali oxide and $B_2O_3$, and a K value ($K=[SiO_2]/[B_2O_3]$) represents a molar ratio between $SiO_2$ and $B_2O_3$.

It may be seen that such $N_4$ value increases as the alkali content increases and then decreases, and increases as the $SiO_2$ content increases.

Therefore, in the present disclosure, it is found that the content of the $BO_4$ structure in the glass structure should be great to exhibit the excellent laundry power. As a result, in the present disclosure, it is found that certain levels of the alkali oxide and $SiO_2$ are required to design the glass composition exhibiting the excellent laundry power. However, when the content of $SiO_2$ increases, the glass structure is strengthened, which rapidly decreases the elution and thus greatly decreases the laundry power.

Hereinafter, a method for preparing glass powder for eco-friendly laundry detergent and washing supplement according to an embodiment of the present disclosure will be described with reference to the accompanying drawing.

FIG. 1 is a process flowchart showing a method for preparing glass powder for eco-friendly laundry detergent and washing supplement according to an embodiment of the present disclosure.

As shown in FIG. 1, the method for preparing the glass powder for the eco-friendly laundry detergent and washing supplement according to the embodiment of the present disclosure includes a mixing (S110), a melting (S120), a cooling (S130), and a pulverizing (S140).

Mixing

In the mixing (S110), 45 to 80 wt % of $B_2O_3$, 1 to 10 wt % of $SiO_2$, and 10 to 50 wt % of at least one of $Na_2O$ and $K_2O$ are mixed with each other and stirred to form a glass composition.

In this regard, $B_2O_3$ is preferably added in an amount in a range from 48 to 70 wt %, and $SiO_2$ is preferably added in an amount in a range from 5 to 8 wt %.

In addition, it is more preferable that at least one of $Na_2O$ and $K_2O$ is added in an amount in a range from 20 to 45 wt %.

In addition, $Na_2O$ and $K_2O$ are preferably added in an amount range that satisfies following Formula 1.

$$0.5 \leq [Na_2O]/[K_2O] \leq 1.5 \qquad \text{Formula 1:}$$

Here, [ ] represents a content ratio of each component.

In this regard, $B_2O_3$ exists as $BO_3$ and $BO_4$ in the glass, and it is preferable that the $N_4$ value, which is a ratio of a $BO_4$ structure, is contained within a range that satisfies Formula 2 below.

$$0.3 \leq ([BO_4])/([BO_3]+[BO_4]) \leq 0.52 \qquad \text{Formula 2:}$$

Here, [ ] represents a weight ratio of each component.

Melting

In the melting (S120), the glass composition is melted.

In the present step, the melting is preferably performed at a temperature in a range from 800 to 1,300° C. for 1 to 60 minutes. When the melting temperature is lower than 800° C. or the melting duration is shorter than 1 minute, the composite glass composition is not completely melted, causing unmixing of a glass melt. Conversely, when the melting temperature exceeds 1,300° C. or the melting duration exceeds 60 minutes, it is not economical because excessive energy and time are required.

Cooling

In the cooling (S130), the molten glass composition is cooled to a room temperature.

In the present step, the cooling is preferably performed in a cooling in furnace scheme. When air-cooling or water-cooling is applied, internal stress of the composite glass is severely generated, and thus, cracks are able to occur in some cases. Therefore, the cooling in furnace is preferable for the cooling.

Pulverizing

In the pulverizing (S140), the cooled glass is pulverized. In this regard, it is preferable to use a ball mill for the pulverizing.

By such pulverizing, the glass is finely pulverized to prepare the glass powder. The glass powder preferably has an average diameter equal to or smaller than 30 μm, and an average diameter in a range from 15 to 25 μm may be presented as a more preferable range.

With the above processes (S110 to S140), the glass powder for the eco-friendly laundry detergent and washing supplement according to the embodiment of the present disclosure may be prepared.

When the glass powder for the eco-friendly laundry detergent and washing supplement prepared by the method according to the embodiment of the present disclosure is used as the laundry detergent or the washing supplement, the glass powder may exhibit the excellent washing power compared to the existing commercial detergent.

In addition, because the glass powder for the eco-friendly laundry detergent and washing supplement prepared by the method according to the embodiment of the present disclosure may not only shorten the rinsing process, but also reduce the water consumption during the laundry because the surfactant is not added thereto.

In addition, when using the glass powder for the eco-friendly laundry detergent and washing supplement prepared by the method according to the embodiment of the present disclosure as the laundry detergent or the washing supplement, the washing power may be maximized when the glass powder is used together with the glass elution water, so that the energy saving effect may be achieved with the reduction of the laundry duration and the reduction of the water consumption.

In addition, when the glass powder for the eco-friendly laundry detergent and washing supplement prepared by the method according to the embodiment of the present disclosure is used as the laundry detergent or the washing supplement and put into the automatic detergent box of a washing machine, the glass may be homogeneously and constantly eluted, so that the recurring period may be extended and the high reliability may be maintained even in the repeated laundry processes.

Present Examples

Hereinafter, a configuration and an operation of the present disclosure will be described in more detail with preferred embodiments of the present disclosure. However, this is presented as a preferred example of the present disclosure and is not able to be construed as limiting the present disclosure in any way.

Contents not described herein may be technically inferred by those skilled in the art, so that a description thereof will be omitted.

1. Specimen Preparation

Table 1 shows components of glass compositions and component ratios thereof of specimens according to Present Examples 1 to 9 and Comparative Examples 1 to 4. In this regard, in Present Examples 1 to 9 and Comparative Examples 1 to 4, the components were mixed with each other and stirred based on the compositions shown in Table 1 to form the glass compositions, then the glass compositions were melted in an electric furnace at a temperature of 1,050° C. and then cooled in a form of a glass bulk in the air-cooling scheme on a stainless steel plate to obtain pieces of glass in a form of a cullet. Thereafter, the pieces of glass were pulverized using the ball mill and then passed through a 400 mesh sieve to prepare glass powder specimens. In this regard, $Na_2CO_3$ and $K_2CO_3$ were used as raw materials for $Na_2O$ and $K_2O$, respectively, and for the other components except for these, those described in Table 1 were used.

TABLE 1

(Unit: wt %)

| Division | $SiO_2$ | $B_2O_3$ | $Na_2O$ | $K_2O$ | $N_4$ value |
|---|---|---|---|---|---|
| Present Example 1 | 8 | 53 | 0 | 39 | 0.50393 |
| Present Example 2 | 8 | 48 | 0 | 44 | 0.477413 |
| Present Example 3 | 9 | 58 | 33 | 0 | 0.484145 |
| Present Example 4 | 2 | 70 | 10 | 18 | 0.350512 |
| Present Example 5 | 2 | 70 | 14 | 14 | 0.372488 |
| Present Example 6 | 2 | 70 | 19 | 9 | 0.399909 |
| Present Example 7 | 5 | 70 | 12.5 | 12.5 | 0.332559 |
| Present Example 8 | 2 | 62 | 25.5 | 10.5 | 0.481896 |
| Present Example 9 | 4 | 54 | 21 | 21 | 0.454972 |
| Comparative Example 1 | 70 | 0 | 30 | 0 | — |
| Comparative Example 2 | 60 | 0 | 0 | 40 | — |
| Comparative Example 3 | 35 | 35 | 10 | 20 | 0.552641 |
| Comparative Example 4 | 40 | 20 | 0 | 40 | 0.582055 |

2. Evaluation of Washing Power

Table 2 shows washing power evaluation results of the specimens according to Present Examples 1 to 9 and Comparative Examples 1 to 4, and Table 3 shows washing power evaluation results of tap water and commercial detergents. In this regard, in Table 3, two types of commercial liquid detergents (a product P of company H and a product T of company L) were used, and were quantitatively added to be used as reference standards to determine the washing power level of the glass elution water.

In this regard, the washing power evaluation was performed using a Terg-O-Tometer.

First, for the preparation of the elution water, 60 g of each glass powder prepared according to each of Present Examples 1 to 9 and Comparative Examples 1 to 4 was continuously immersed in a plastic container containing 600 mL of room temperature water, and 10 mL of the elution water was drawn every 30 minutes to evaluate the washing power.

In this regard, washing power for each composition of the glass elution water was reviewed using a total of three soiled fabrics of EMPA fabrics contaminated with red wine and blood and a Jis fabric (a composite soiled fabric). Evaluation of detergent power was performed using the KS M 2709 standard.

10 mL of 600 mL of the glass elution water was added to 1 L of tap water to perform the laundry for 10 minutes at 30° C. and then the rinsing process was repeated twice with 1 L of the tap water for 3 minutes.

TABLE 2

| Division | Wine (%) | Blood (%) | Jis (%) |
|---|---|---|---|
| Present Example 1 | 47.9 | 56.3 | 33.2 |
| Present Example 2 | 46.0 | 59.4 | 30.0 |
| Present Example 3 | 44.5 | 54.2 | 32.7 |
| Present Example 4 | 44.7 | 41.0 | 30.0 |
| Present Example 5 | 43.8 | 41.3 | 32.0 |
| Present Example 6 | 45.9 | 43.6 | 34.0 |
| Present Example 7 | 46.3 | 43.5 | 34.5 |
| Present Example 8 | 42.6 | 54.4 | 29.0 |
| Present Example 9 | 35.6 | 56.1 | 32.3 |
| Comparative Example 1 | 36.6 | 27.7 | 11.7 |
| Comparative Example 2 | 31.6 | 46.9 | 21.5 |
| Comparative Example 3 | 38.1 | 30.7 | 10.0 |
| Comparative Example 4 | 37.7 | 30.2 | 6.6 |

TABLE 3

| Reference | Wine (%) | Blood (%) | Jis (%) |
|---|---|---|---|
| Tap water | 39.2 | 25.1 | 10.2 |
| Product P of company H | 49.6 | 30.8 | 37.1 |
| Product T of company L | 40.2 | 27.9 | 30.2 |

As shown in Tables 1 to 3, as may be seen from the washing power evaluation results of Present Examples 1 to 9 and Comparative Examples 1 to 4, it was confirmed that the washing power is excellent with the content of $B_2O_3$ in a range from 45 to 70 wt %, the content of $SiO_2$ in a range from 1 to 10 wt %, and the content of the alkali oxide in a range from 10 to 50 wt %.

On the other hand, as may be seen in Comparative Examples 1 and 2, even when the content of $SiO_2$ is great, the elution may occur sufficiently in a composition with a great alkali content. However, it may be seen that the washing power is reduced as discoloration caused by a wine pigment occurs because of high pH resulted from absence of $B_2O_3$.

In addition, it may be seen that the washing power was rapidly decreased in Comparative Examples 3 to 4 with the $N_4$ value equal to or greater than 0.55. It is determined that such decrease occurred because the content of $SiO_2$ in the borate glass structure is greatly increased and thus the structure is strengthened.

As shown in Tables 2 and 3, it was confirmed that, in the case of Present Examples 1 to 9, the laundry power of the glass elution water was far superior to that of the tap water, and a performance similar to or higher than that of the commercial detergents was achieved.

As may be seen based on the above experimental results, it is determined that Present Examples 1 to 9 may have a great significance in terms of production of the new laundry detergent that shows the excellent washing power without the surfactant added thereto, at the same time, reduce an amount of detergent used when used together with the laundry detergent, and promote the energy saving effect by saving water, time, and the like.

As described above, the present disclosure has been described with reference to the drawings illustrated, but the present disclosure is not limited by the embodiments disclosed herein and drawings, and it is obvious that various modifications may be made by those skilled in the art within the scope of the technical idea of the present disclosure. In addition, although the operational effects based on the configuration of the present disclosure have not been explicitly described while describing the embodiments of the present disclosure, it is obvious that the effects predictable by the corresponding configuration should also be acknowledged.

REFERENCE NUMERALS

S110: MIXING
S120: MELTING
S130: COOLING
S140: PULVERIZING

What is claimed is:

1. A glass composition for laundry detergent or washing supplement, the glass composition consisting of:
   from 45 to 80 wt % of $B_2O_3$;
   from 2 to 9 wt % of $SiO_2$; and
   from 10 to 50 wt % of at least one of $Na_2O$ and $K_2O$.

2. The glass composition of claim 1, wherein an amount of the $B_2O_3$ is within a range from 48 to 70 wt %.

3. The glass composition of claim 1, wherein an amount of the $SiO_2$ is within a range from 5 to 8 wt %.

4. The glass composition of claim 1, wherein an amount of $Na_2O$ and $K_2O$ is within a range from 20 to 45 wt %.

5. The glass composition of claim 1, wherein amounts of the $Na_2O$ and the $K_2O$ satisfy a following Formula 1, $$0.5 \leq [Na_2O]/[K_2O] \leq 1.5 \qquad \text{Formula 1:}$$

(where, represents a content ratio of the corresponding component).

6. The glass composition of claim 1, wherein the $B_2O_3$ exists as $BO_3$ and $BO_4$ in glass, wherein a $N_4$ value, which is a ratio of a $BO_4$ structure, satisfies a following Formula 2, $$0.3 \leq ([BO_4])/([BO_3]+[BO_4]) \leq 0.52 \qquad \text{Formula 2:}$$

(where, represents a weight ratio of the corresponding component).

7. A method for preparing glass powder for laundry detergent or washing supplement, the method comprising:

(a) forming a glass composition by mixing a combination that consists of from 45 to 80 wt % of $B_2O_3$, from 2 to 9 wt % of $SiO_2$, and from 10 to 50 wt % of at least one of $Na_2O$ and $K_2O$;

(b) melting the glass composition;

(c) cooling the melted glass composition; and (d) pulverizing the cooled melted glass composition.

8. The method of claim 7, wherein the glass composition includes an amount of the $B_2O_3$ within a range from 48 to 70 wt %.

9. The method of claim 7, wherein the glass composition includes an amount of the $SiO_2$ within a range from 5 to 8 wt %.

10. The method of claim 7, wherein the glass composition includes an amount of the at least one of $Na_2O$ and $K_2O$ within a range from 20 to 45 wt %.

11. The method of claim 7, wherein the glass composition include amounts of the $Na_2O$ and the $K_2O$ that satisfy a following Formula 1, $$0.5 \leq [Na_2O]/[K_2O] \leq 1.5 \qquad \text{Formula 1:}$$

(where, represents a content ratio of the corresponding component).

12. The method of claim 7, wherein the melting of the glass composition includes performing the melting at a temperature in a range from 800 to 1,300° C. for 1 to 60 minutes.

13. The method of claim 7, wherein after the pulverizing, the $B_2O_3$ exists as $BO_3$ and $BO_4$ in the glass, wherein a $N_4$ value, which is a ratio of a $BO_4$ structure, satisfies a following Formula 2, $$0.3 \leq ([BO_4])/([BO_3]+[BO_4]) \leq 0.52 \qquad \text{Formula 2:}$$

(where, represents a weight ratio of the corresponding component).

14. A method for preparing glass powder, the method comprising:
   forming a glass composition that consists of from 45 to 80 wt % of $B_2O_3$, from 2 to 9 wt % of $SiO_2$, and from 10 to 50 wt % of at least one of $Na_2O$ and $K_2O$; and
   melting the glass composition at a temperature in a range from 800 to 1,300° C.

15. The method of claim 14, comprising:
   cooling the melted glass composition in a furnace to form cooled glass.

16. The method of claim 15, comprising:
   pulverizing the cooled glass to form the glass powder.

17. The method of claim 14, wherein the glass composition includes an amount of the $B_2O_3$ within a range from 48 to 70 wt %.

18. The method of claim 14, wherein the glass composition includes an amount of the $SiO_2$ within a range from 5 to 8 wt %.

19. The method of claim 14, wherein the glass composition includes an amount of $Na_2O$ and $K_2O$ within a range from 20 to 45 wt %.

20. The method of claim 14, wherein the glass composition includes amounts of the $Na_2O$ and the $K_2O$ that satisfy a following Formula 1, $$0.5 \leq [Na_2O]/[K_2O] \leq 1.5 \qquad \text{Formula 1:}$$

(where, represents a content ratio of the corresponding component).

* * * * *